(12) United States Patent
Fehring

(10) Patent No.: US 6,279,711 B1
(45) Date of Patent: Aug. 28, 2001

(54) ADJUSTABLE CENTRIFUGAL CLUTCH

(76) Inventor: Thomas C. Fehring, 5167 Michael Anthony La., Cincinnati, OH (US) 45247

( * ) Notice: Subject to any disclaimer, the term of this patent is extended or adjusted under 35 U.S.C. 154(b) by 0 days.

(21) Appl. No.: 09/489,071

(22) Filed: Jan. 21, 2000

(51) Int. Cl.⁷ .............................. F16D 43/10; F16D 13/75
(52) U.S. Cl. .................................... 192/105 C; 192/110 R
(58) Field of Search ...................... 192/105 C, 105 CS, 192/103 A, 110 R, 70.23, 70.24

(56) References Cited

U.S. PATENT DOCUMENTS

| | | | |
|---|---|---|---|
| 2,038,038 | * | 4/1936 | Gregg ................................ 192/105 C |
| 2,055,177 | * | 9/1936 | Lyman .............................. 192/105 C |
| 2,780,335 | * | 2/1957 | Hubbard ..................... 192/105 CS X |
| 2,802,370 | * | 8/1957 | Benzin ......................... 192/105 C X |
| 3,291,274 | * | 12/1966 | Wyman ............................. 192/105 C |
| 3,769,905 | * | 11/1973 | Dishcler ........................ 192/105 C X |
| 4,111,291 | | 9/1978 | Horstman . |
| 4,856,637 | * | 8/1989 | Gebhart ............................ 192/105 C |
| 5,070,984 | | 12/1991 | Fehring . |
| 5,284,234 | | 2/1994 | Miglizzi . |
| 5,638,935 | | 6/1997 | Fehring . |
| 5,967,286 | * | 10/1999 | Hokanson et al. ............... 192/110 R |

* cited by examiner

Primary Examiner—Rodney H. Bonck
(74) Attorney, Agent, or Firm—Wood, Herron & Evans L.L.P.

(57) ABSTRACT

A kinematically simple centrifugal clutch to minimize frictional induced hysteresis. The centrifugal clutch includes a rotatable output driven member, two drive plates, and at least one clutch disc disposed adjacent to the drive plates. A drive hub is adapted to receive a rotational input such as that from an output shaft of a motor. Two weighted members are pivotally mounted to the drive hub. Two spring members are operative between the drive hub and the weighted member to apply a restoring force to the weighted members. Under the influence of centrifugal force generated by the rotation of the drive hub, the weighted members pivots against the resistance of the spring member so as to engage the drive plates and thereby urge the drive plates into engagement with the clutch disc such that the driven member rotates with the drive plates.

10 Claims, 4 Drawing Sheets

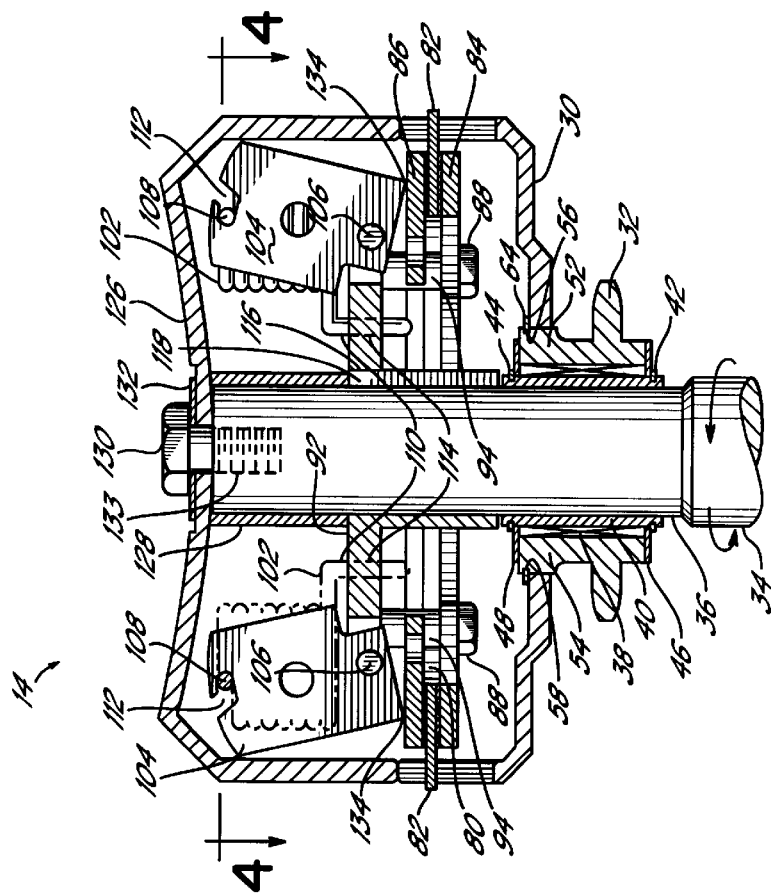

ADJUSTABLE CENTRIFUGAL CLUTCH

FIELD OF THE INVENTION

This invention is directed to clutches, and more particularly to centrifugal clutches.

BACKGROUND OF THE INVENTION

Centrifugal clutches are well known in the art. In essence, these devices, sometimes known as frictional contact axial clutches, utilize mating frictional members to transfer torque from an input shaft to an output shaft. This is accomplished by harnessing the effects of centrifugal force upon pivoted weights to generate axial movement and ultimately axial thrust. This axial thrust is applied upon an output frictional member which, by interacting with an input shaft frictional member, effectively transmits the input shaft torque to the output or driven shaft.

In one such type of clutch, weights are attached to a support disc which is mounted for rotation with a rotating input shaft. The weights are mounted to pivot about an axis perpendicular to the rotational axis of a support disc. The weights are spring biased to a non-engaging position relative to a clutch plate. As the angular speed increases, the weights pivot as the centrifugal force of the pivoting weights overcome the force generated by the springs and engage the clutch plate. With increasing angular speed, the weights pivot more and the clutch plate engages a clutch disc which is splined to an output drum. The plurality of springs which are operative between the support disc and the clutch plate pull the clutch plate toward the support disc. Thus, as the angular speed decreases, the springs push against the pivoted weights to restore the weights to their non-engaging, i.e., non-pivoted, position. Consequently, the clutch plate disengages the clutch disc such that the output drum is not actively driven.

There are several disadvantages associated with the type of clutch described above. One particular problem associated with this centrifugal clutch is frictional induced hysteresis. Friction acting upon the springs and weights causes the clutch to engage at one speed yet disengage at another speed. Typically, the frictional induced hysteresis causes the clutch to engage at a higher speed but disengage at a lower speed. Preferably, the engagement and disengagement speeds are substantially equivalent to one another, allowing for smoother operation of the centrifugal clutch when used on motorized vehicles such as racing karts. Furthermore, prior centrifugal clutches are too complicated, costly, and relatively heavy. Additionally, adjusting the springs to achieve different engagement speeds is difficult, imprecise, and cumbersome.

What is needed, therefore, is a centrifugal clutch which is kinematically simpler so as to minimize frictional induced hysteresis during its operation to provide a centrifugal clutch with substantially equivalent engagement and disengagement speeds. This clutch should also be less complicated, less expensive, and relatively lightweight. Finally, the springs such be designed to be relatively simple to adjust and replace in order to allow for efficient adjustment of the engagement speed.

SUMMARY OF THE INVENTION

The present invention is directed to a kinematically simple centrifugal clutch which minimizes frictional induced hysteresis. The centrifugal clutch also provides an efficient manner to adjust the clutch's engagement speed. To that end and in accordance with the principles of the present invention, the centrifugal clutch includes a rotatable output driven member, at least one drive plate, and at least one clutch disc disposed adjacent to the drive plate. The clutch disc is mounted for rotation with the driven member. A drive hub is adapted to receive a rotational input such as that from an output shaft of a motor. The drive hub is mounted for rotation with the drive plate. At least one weighted member is pivotally mounted to the drive hub. At least one spring member is operative between the drive hub and the weighted member to apply a restoring force to the weighted members. Various types of spring members could be utilized to apply a restoring force to the weighted member. For example, the spring member may be a torsion spring, an extension spring, or a garter spring. Under the influence of centrifugal force generated by the rotation of the drive hub, the weighted member pivots against the resistance of the spring member so as to engage the drive plate and thereby urge the drive plate into engagement with the clutch disc to rotate the driven member in unison with the rotating drive hub. As the rotational speed of the drive hub decreases, the centrifugal force is overcome by the restoring force of the spring member and the weighted member pivots out of engagement with the drive plate, causing the drive plate to disengage the clutch disc. Consequently, the driven member is no longer actively driven by the clutch disc.

In one embodiment, the drive hub includes at least two attachment posts and the spring members are torsion springs mounted concentrically about the attachment posts. The drive hub also includes at least two adjustment holes associated with each attachment post. One end of the torsion spring can be selectively inserted into a desired adjustment hole to alter the restoring force exerted by the torsion spring onto the weighted members.

Although the centrifugal clutch of the present invention may be used in applications requiring a clutch mechanism intermediate to a drive motor and a drive wheel, it is specifically adapted for application in motorized carts, especially racing karts.

Various additional advantages, objects and features of the invention will become more readily apparent to those of ordinary skill in the art upon consideration of the following detailed description of the presently preferred embodiments taken in conjunction with the accompanying drawings.

DETAILED DESCRIPTION OF THE DRAWINGS

FIG. 2 is a cross-sectional view taken along line 2—2 of the clutch of FIG. 1;

FIG. 3 is a view similar to FIG. 2 illustrating the clutch engaged;

DETAILED DESCRIPTION OF PREFERRED EMBODIMENTS

Figure 1:
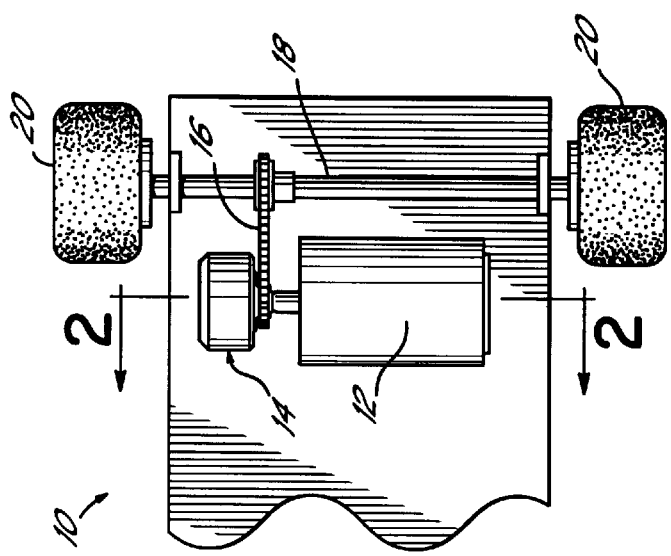
FIG. 1 is a bottom plan view of a vehicle including a centrifugal clutch according to the principles of the present invention.
Figure 5:
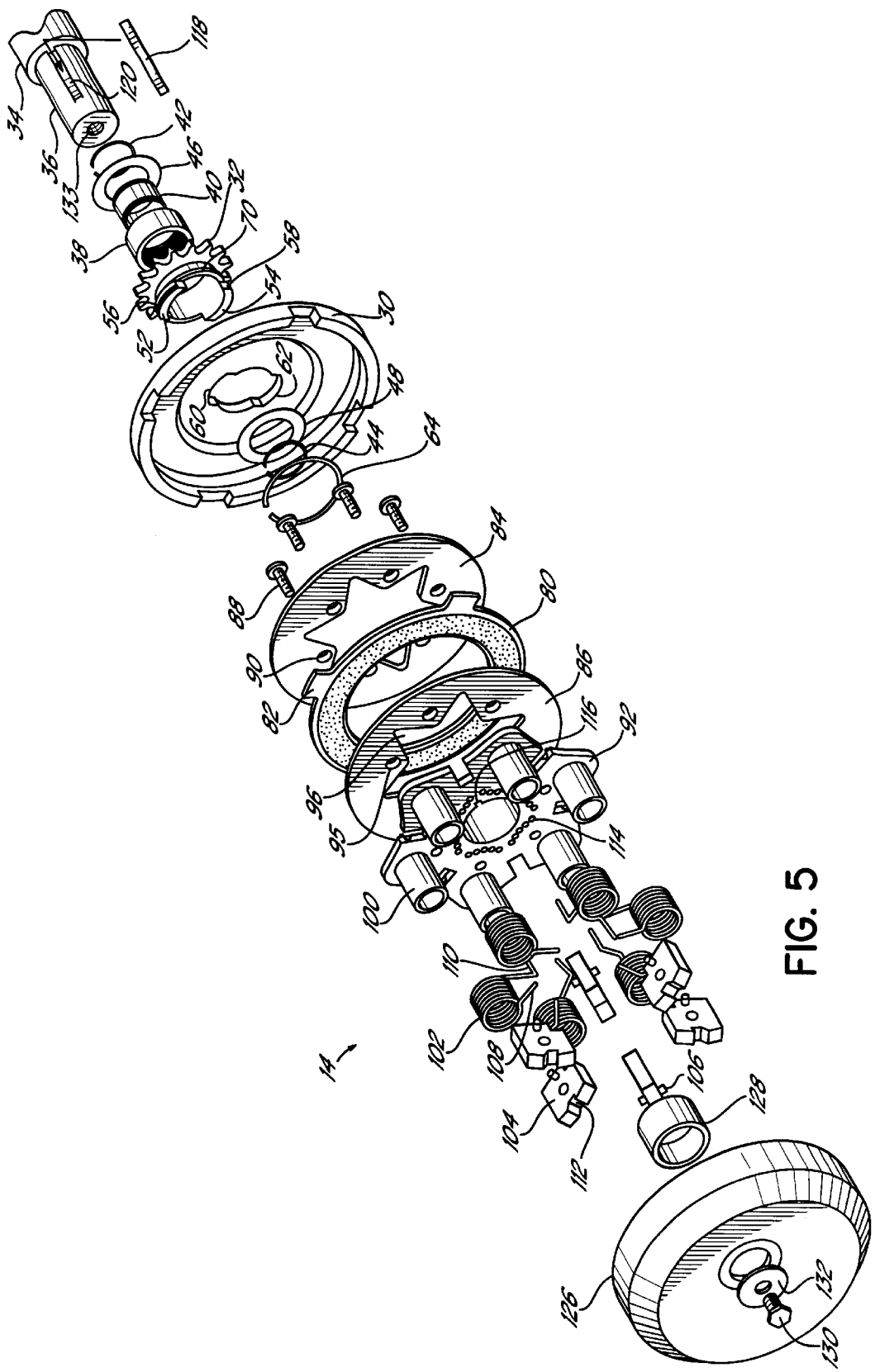
FIG. 5 is an exploded perspective of the clutch of FIGS. 2–5.

Referring first to FIG. 1, a vehicle 10, such as a motorized cart, includes a motor 12 connected to a centrifugal clutch 14 of the present invention for transmitting rotation via a drive chain 16 to a drive shaft 18 for driving wheels 20.

Referring now to FIGS. 2–5, the centrifugal clutch 14 of the present invention is shown in more detail. More particularly, the centrifugal clutch 14 comprises a drum or housing 30 to which is attached an output sprocket 32 for accepting the chain 16 (FIG. 1). A drive shaft 34 includes a necked down portion 36 which extends into the centrifugal clutch 14. Bearing 38 having an inner race 40 supported by the necked down portion 36 allows the drive shaft 34 to rotate independently of the drum 30. Retaining rings 42, 44 cooperate respectively with washers 46, 48 to secure the inner race 40 within bearing 38. The sprocket includes peripheral members 52, 54 having grooves 56, 58, respectively. The peripheral members 52, 54 are fitted respectively into slots 60, 62 so that the sprocket 32 and the drum 30 rotate in unison. Retaining ring 64 inserted in grooves 56, 58 cooperates with lip 70 to secure sprocket 32 to drum 30.

The centrifugal clutch 14 further includes a clutch disc 80 which includes tabs 82. The clutch disc 80 is interleaved between two drive plates 84, 86. Screws 88 are inserted through holes 90 of drive plate 84 to secure drive plate 84 to drive hub 92. Spacers 94 (FIGS. 2, 3) fixedly space drive plate 84 away from drive hub 92. Drive plate 86 is rotated relative to drive plate 84 such that the screws 88 do not pass through holes 95 of drive plate 86 but through open areas 96. Consequently, drive plate 86 rotates in unison with drive plate 84 and drive hub 92, but is able to translate axial relative to drive plate 84 and drive hub 92 along spacers 94. It can be appreciated that additional clutch discs 80 could be used in the centrifugal clutch 14. For each additional clutch disc 80 added, an additional drive plate 86 is added with the additional clutch disc 80 interleaved therebetween. Additional clutch discs 80 may be required when a relatively large amount of torque is to be transmitted from the motor 12 to the wheels 20.

Drive hub 92 includes a plurality of attachment posts or spring towers 100 equally spaced about the drive hub 92. Torsion springs 102 are concentrically mounted on each spring tower 100. Weighted members or levers 104 are pivotally attached to drive hub 92 with dowel pins 106. Torsion springs 102 have first and second ends 108, 110. The first end 108 is placed within slot 112 of weighted member 104 (FIGS. 2 and 3). The second end 110 is placed with one of several adjustment holes 114 in drive hub 92. The second end 110 may be selectively placed in any of the adjustment holes 114 in order to alter the restoring force that the torsion spring 102 exerts on the weighted member 104. The drive hub 92 further includes a keyway 116. Keyway 116 cooperates with key 118 and keyway 120 of necked down portion 36 such that the drive hub 92 rotates in unison with drive shaft 34.

A cover 126 concentrically abuts drum 30 to enclose the operational structure of the centrifugal clutch 14, protecting it from foreign debris which may damage or destroy it. A spacer 128 is positioned between the interior of the cover 126 and the drive hub 92. The cover 126 is secured to the end of the drive shaft 34 with bolt 130 and washer 132. The bolt 130 is threaded into a threaded opening 133 in the necked down portion 36 of drive shaft 34.

The operation of the centrifugal clutch 14 is best illustrated with respect to FIGS. 2 and 3. In FIG. 2, drive shaft 34 is not rotating. Accordingly, each weighted member 104 is held by torsion spring 102 in a non-pivoted position. As such, the drive plate 86 is still free to move axially along the spacers 94. As the drive shaft 34 begins to rotate, the drive hub 92 and drive plates 84 and 86 rotate as well. However, because drive plate 84 is spaced away from drive hub 92 and drive plate 86 is free to move along spacers 94, the clutch disc 80 does not rotate in unison with the drive plates 84, 86. Consequently, the drum 30 and the sprocket 32 do not turn, and hence the vehicle 10 does not move.

Figure 4:
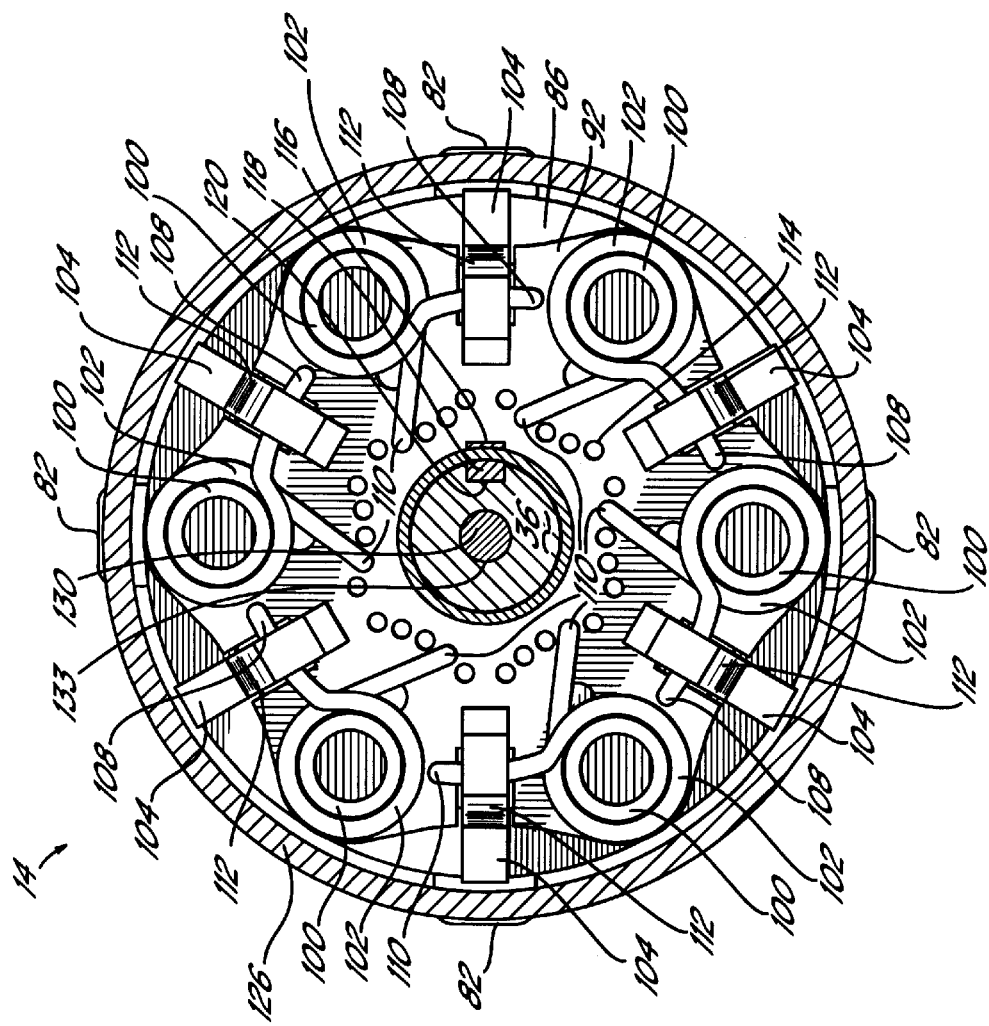
FIG. 4 is a cross-sectional view taken along line 4—4 of FIG. 3.

As the rotational speed of the drive shaft 34 increases and as illustrated in FIG. 4, the centrifugal force experienced by the weighted members 104 cause the weighted members 104 to pivot about dowel pins 106. Corner section 134 of weighted member 104 engages drive plate 86 and urges drive plate 86 into engagement with clutch disc 80. When the rotational speed of drive shaft 34 and drive hub 92 reach a predetermined speed, commonly referred to as the engagement speed, the weighted members 104 pivot sufficiently such that the drive plates 84, 86 fully engage clutch disc 80. Accordingly, the clutch disc rotates drum 30 and sprocket 32 and the vehicle 10 is propelled forward. As the rotational speed decreases the centrifugal force is reduced and the torsion springs 102 act to reduce the engagement force the weighted members 104 exert on the drive plates 84, 86. At a predetermined speed, commonly referred to as the disengagement speed, the weighted members 104 disengage drive plates 84, 86 such that the clutch disc 80 no longer rotates in unison with drive shaft 34 and drive hub 92. Consequently, the vehicle is no longer actively propelled forward. As mentioned above, the second end 110 of torsion spring can be repositioned in adjustment holes 114 so that the restoring force can be changed. As the restoring force is reduced, the engagement speed is correspondingly reduced. That is, with reduced restoring force acting on the weighted members 1 04, less rotational speed is required to engage the clutch disc 80 and propel the vehicle 10 forward.

It can be appreciated that the torsion springs 102 could be replaced by any suitable resilient member adapted to apply a tension, compression, or torsion force between the weighted members 104 and the drive hub 92 to bias the weighted members 104 to a non-engaging position. In addition to the torsion spring 102, the resilient member may be an extension spring, a garter spring, or a leaf spring, for example. The resilient member may also be an elastic band, such as a rubber band.

Figure 6C:
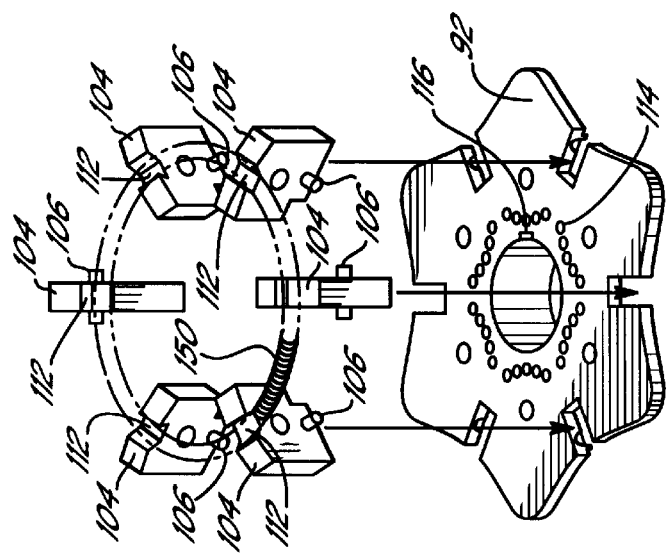
FIG. 6C is partial cross-sectional view showing still another spring arrangement.
Figure 6A:
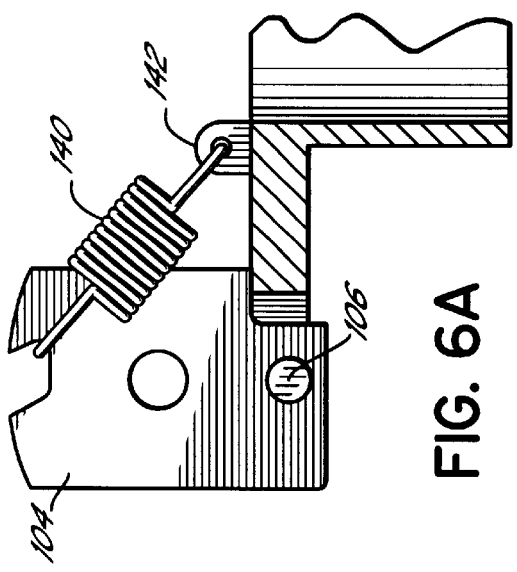
FIG. 6A is perspective view showing an alternate spring arrangement.
Figure 6B:
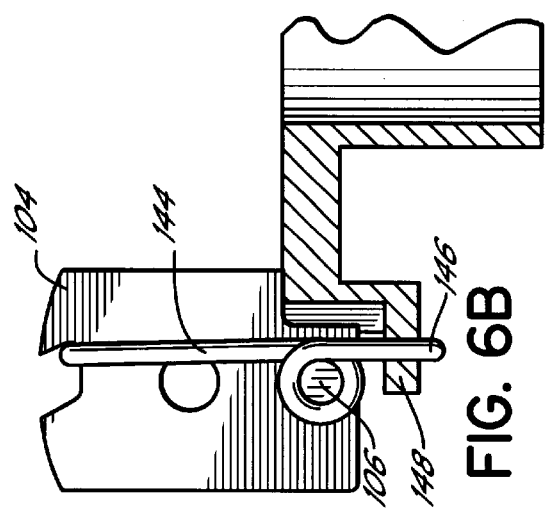
FIG. 6B is a partial cross-sectional view showing another spring arrangement.

With specific reference to FIG. 6A, an extension spring 140 is operatively disposed between the weighted member 104 and an attachment lug 142. It can be appreciated that an attachment lug 142 with multiple holes would allow for adjustment of the restoring force applied the weighted member 104. With reference to FIG. 6B, a torsion spring 144 is mounted concentrically about dowel pin 106. An end 146 of the torsion spring 144 is fixedly held by lug 148 extending from drive hub 92. The torsion spring 144 exerts a restoring force on weighted member 104 as it pivots under the influence of centrifugal force.

A slightly different spring arrangement is illustrated in FIG. 6C. A garter spring 150 is placed into the slots 112 of the six weighted members 104. The single garter spring 150 exerts a restoring force onto the six weighted members simultaneously. In this particular embodiment, the garter spring 150 is indirectly operative between the drive hub 92 and the weighted members 104. That is to say, the garter spring 150 relies on the interaction between individual weighted members 104 and drive hub 92 to produce a restoring force. Garter springs 150 with different spring constants could be utilized to change the restoring force and thus, the engagement speed.

While the present invention has been illustrated by a description of various preferred embodiments and while these embodiments have been described in considerable detail in order to describe the best mode of practicing the invention, it is not the intention of the applicants to restrict or in any way limit the scope of the appended claims to such detail. Additional advantages and modifications within the spirit and scope of the invention will readily appear to those skilled in the art. The invention itself should only be defined by the appended claims, wherein I claim:

What is claimed is:

1. A centrifugal clutch comprising:
   a rotatable output driven member;
   two drive plates;
   at least one clutch disc disposed adjacent to said drive plates, said clutch disc mounted for rotation with said driven member;
   a drive hub adapted to receive a rotational input and mounted for rotation with said drive plates, said drive hub includes two attachment posts and at least two adjustment holes associated with each of said attachment posts;
   two weighted members pivotally mounted to said drive hub; and
   two torsion springs, each torsion spring operative between said drive hub and respective ones of said weighted members to bias each of said weighted members to a normally disengaged position relative to said drive plates, said torsion springs are mounted concentrically about respective attachment posts, each of said torsion springs having a first end selectively movable between said adjustment holes;
   wherein rotation of said drive hub causes said weighted members to pivot by centrifugal force against respective ones of said torsion springs to an engaged position thereby urging said drive plates into engagement with said clutch disc such that said driven member rotates with said drive plates.

2. The centrifugal clutch of claim 1 comprising six attachment posts, five adjustment holes associated with each attachment post, six torsion springs, and six weighted members.

3. A motorized vehicle having a motor, at least one drive wheel, and a centrifugal clutch operative between the motor and the drive wheel to transfer rotational output from the motor to the drive wheel to propel the motorized vehicle, the centrifugal clutch comprising:
   a rotatable output driven member operatively connected to said drive wheel;
   two drive plates;
   at least one clutch disc disposed adjacent to said drive plates, said clutch disc mounted for rotation with said driven member;
   a drive hub adapted to receive a rotational input from said motor and mounted for rotation with said drive plates, said drive hub includes two attachment posts and at least two adjustment holes associated with each of said attachment posts;
   two weighted members pivotally mounted to said drive hub; and
   two torsion springs, each torsion spring operative between said drive hub and respective ones of said weighted members to bias each of said weighted members to a normally disengaged position relative to said drive plates, said torsion springs are mounted concentrically about respective attachment posts, each of said torsion springs having a first end selectively movable between said adjustment holes;
   wherein said rotational input from said motor rotates said drive hub causing each of said weighted members to pivot by centrifugal force against respective ones of said respective torsion springs to an engaged position thereby urging said drive plates into engagement with said clutch disc such that said driven member operatively rotates said drive wheel.

4. The motorized vehicle of claim 3 comprising six attachment posts, five adjustment holes associated with each attachment post, six torsion springs, and six weighted members.

5. A centrifugal clutch comprising:
   a rotatable output driven member;
   two drive plates;
   at least one clutch disc disposed adjacent to said drive plates, said clutch disc mounted for rotation with said driven member;
   a drive hub adapted to receive a rotational input and mounted for rotation with said drive plates, said drive hub includes at least two adjustment holes;
   two weighted members pivotally mounted to said drive hub; and
   two spring members, each spring member operative between said drive hub and respective ones of said weighted members to bias each of said weighted members to a normally disengaged position relative to said drive plates, each of said spring members having a first end selectively movable between said adjustment holes;
   wherein rotation of said drive hub causes said weighted members to pivot by centrifugal force against respective ones of said spring members to an engaged position thereby urging said drive plates into engagement with said clutch disc such that said driven member rotates with said drive plates.

6. The centrifugal clutch of claim 5, wherein each of said spring members is a torsion spring.

7. The centrifugal clutch of claim 5, wherein each of said spring members is an extension spring.

8. A centrifugal clutch comprising:
   a rotatable output driven member;
   two drive plates;
   at least one clutch disc disposed adjacent to said drive plates, said clutch disc mounted for rotation with said driven member;
   a drive hub adapted to receive a rotational input and mounted for rotation with said drive plates, said drive hub includes two attachment posts;
   two weighted members pivotally mounted to said drive hub;
   two torsion springs, each torsion spring operative between said drive hub and respective ones of said weighted members to bias each of said weighted members to a normally disengaged position relative to said drive plates, said torsion springs are mounted concentrically about respective attachment posts; and
   two pairs of adjustment holes associated with the clutch, each pair of said adjustment holes cooperative with respective ones of said torsion springs, each of said torsion springs having a first end selectively movable between respective adjustment holes forming one of said pairs of adjustment holes;
   wherein rotation of said drive hub causes said weighted members to pivot by centrifugal force against respective ones of said torsion springs to an engaged position thereby urging said drive plates into engagement with said clutch disc such that said driven member rotates with said drive plates.

9. A centrifugal clutch comprising:

a rotatable output driven member;

two drive plates;

at least one clutch disc disposed adjacent to said drive plates, said clutch disc mounted for rotation with said driven member;

a drive hub adapted to receive a rotational input and mounted for rotation with said drive plates, said drive hub includes two attachment posts;

two weighted members pivotally mounted to said drive hub;

two torsion springs mounted concentrically about respective attachment posts, each torsion spring being operative between said drive hub and respective ones of said weighted members to apply a restoring force to each of said weighted members thereby biasing each of said weighted members to a normally disengaged position relative to said drive plates; and a provision for adjusting said restoring force of each of said torsion springs;

wherein rotation of said drive hub causes said weighted members to pivot by centrifugal force against respective ones of said torsion springs to an engaged position thereby urging said drive plates into engagement with said clutch disc such that said driven member rotates with said drive plates.

10. The centrifugal clutch of claim 9, wherein said provision is adjustment holes in said drive hub, each of said torsion springs having a first end selectively movable between said adjustment holes to alter said restoring force.

* * * * *